Figure 5:
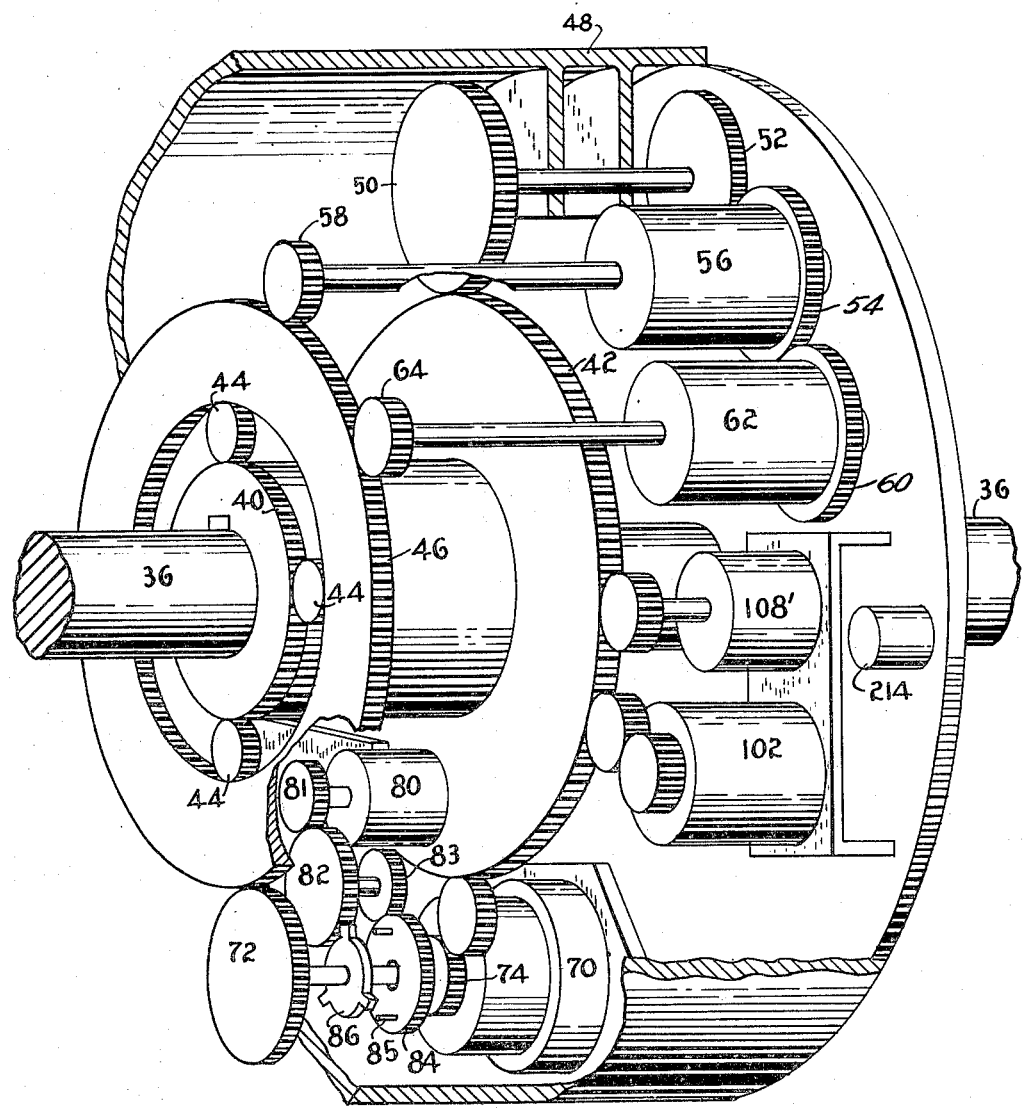

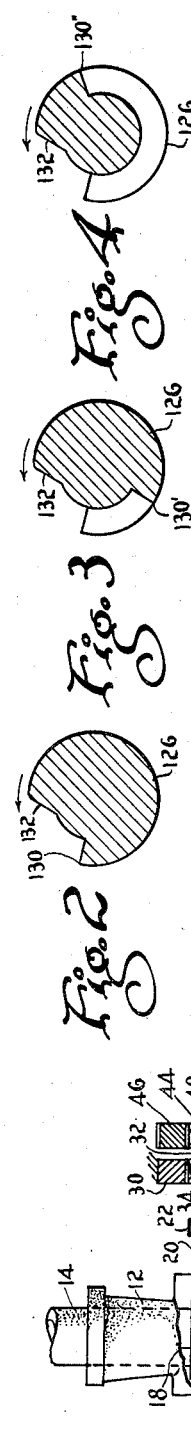

INVENTOR.
JOSEPH M. MERGEN
HOWARD MURPHY

ATTORNEY

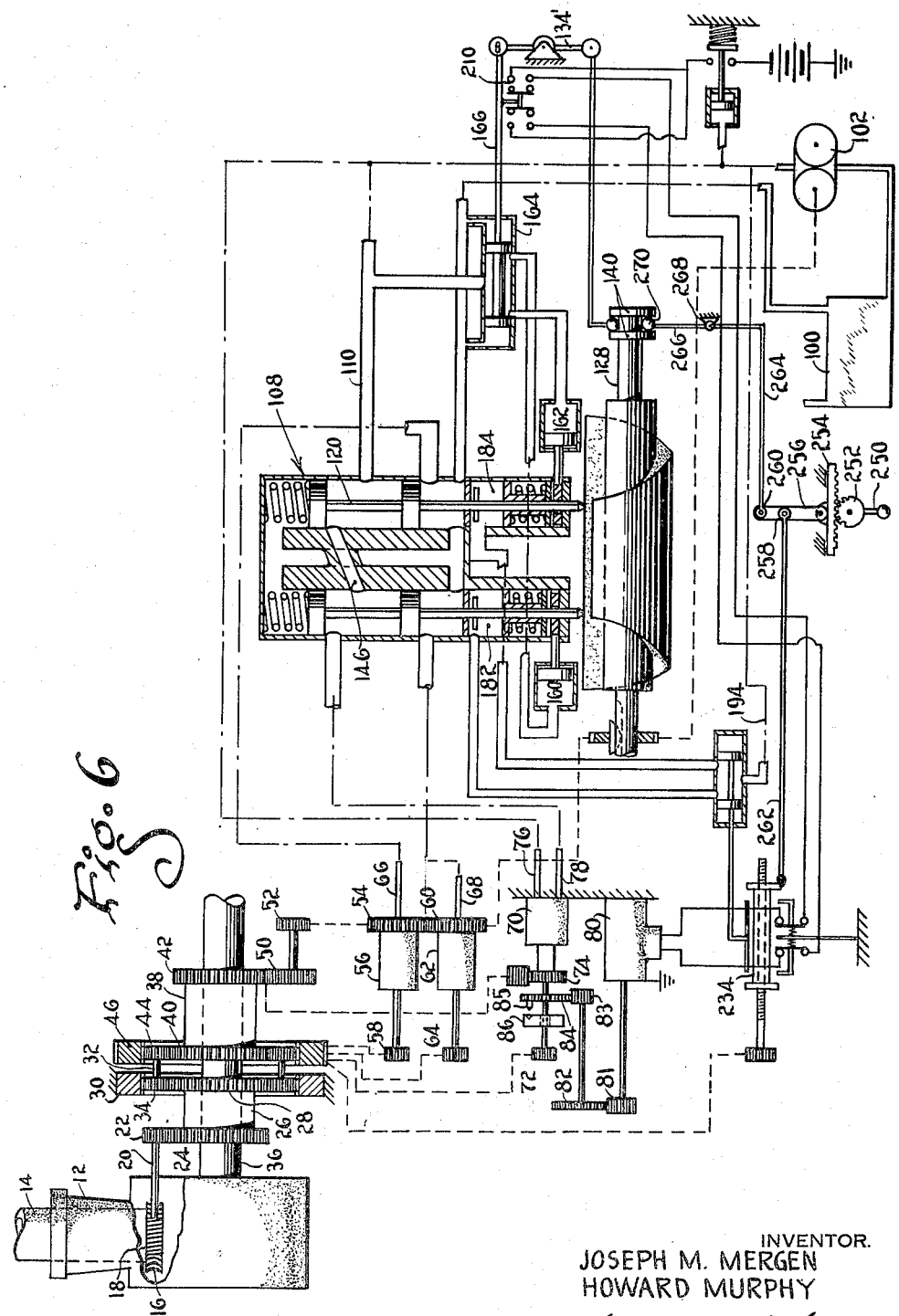

Patented July 21, 1953

2,646,131

UNITED STATES PATENT OFFICE 2,646,131

PROPELLER PITCH CHANGE MECHANISM

Joseph M. Mergen, Verona, and Howard Murphy, Glen Ridge, N. J., assignors to Curtiss-Wright Corporation, a corporation of Delaware Application January 29, 1949, Serial No. 73,586

12 Claims. (Cl. 170—160.28)

This invention relates to variable pitch propellers for aircraft wherein power for effecting changes of blade pitch is primarily derived from the rotation of the propeller with respect to a fixed mounting structure.

The invention, in part, constitutes improvements on the type of propeller disclosed in co-pending Chillson application Serial No. 675,383, filed June 8, 1946. While the present invention may be applied to the propeller of said co-pending application, the principles of the invention are also applicable to other types of propellers utilizing hydraulic motors or clutches and brakes for the application of pitch changing power to the blades.

It is an object of the present invention to provide a mechanism to control the application of pitch changing power to a propeller. It is a further object of the invention to enable the application of pitch changing power to a propeller on an intermittent, pulsating basis, either the frequency or the dwell of the pitch changing power pulses being variable in accordance with the pitch changing effects desired for the propeller. Another object of the invention is to provide a hydraulic valve system intermittently and cyclically operable for the actuation of a power transmission and associated clutches and brakes. Another object of the invention is to provide a power control organization capable of changing propeller blade pitch in different directions and at variable rates in order that a very fine control of pitch adjustment may be attained in the propeller and also, in order that the pitch adjustment may be accomplished at varying rates of pitch change and with the greatest speed consistent with pitch change requirements. Another object of the invention is to associate a pulsating propeller pitch changing control arrangement with auxilary propeller and propeller control mechanism to enable the attainment of normal governing operation, reverse pitch, and feathering, and to afford safety features in propeller operation which will prevent unwanted kinds of propeller operation under emergency conditions. A further object of the invention is to provide a pitch changing control construction which may be incorporated into a unitary propeller arrangement, and which will have features of longevity and serviceability which are essential for consistent performance.

The above and other novel features of the invention will appear more fully in the following detailed description when taken in conjunction with the drawings. The drawings and descriptions however are employed for purposes of illustration of a presently preferred embodiment of the invention and are not to be construed as a definition of the limits of the invention, reference being had to the appended claims to establish the limits of the invention.

In the drawings wherein like reference characters indicate like parts,

Fig. 1 is a schematic view of a propeller system, incorporating a cycling valve and other features of the invention;

Figs. 2, 3 and 4 are sections respectively on the lines 2, 3 and 4 of Fig. 1;

Fig. 5 is an enlarged perspective view of the gear transmission system of a propeller according to Fig. 1; and Fig. 6 is a view, similar to Fig. 1, showing an alternative arrangement for propeller controls.

Referring first to Figs. 1, 5 and 6, a description will be given of the mechanical and gearing components of a typical propeller with which the invention is adapted to be used. This propeller with its mechanical components is similar in many respects to that described in the aforesaid co-pending Chillson application Serial No. 675,383, filed June 8, 1946. In view of the complete showing of mechanical details in the aforesaid application, such details are not repeated in the present application; rather, the essential elements have been shown schematically. In the figures, 10 represents a propeller hub which may, as is well known, have a plurality of blade sockets one of which is shown at 12. In the socket 12, a blade 14 is rotatably carried for pitch change, the blade being provided at its lower end with a worm wheel 16 engaged by a worm 18 driven by a shaft 20 which extends through the rear end of the propeller hub. The shaft 20 carries a pinion 22 drivably engaged with a sleeve gear 24, mounted upon a sleeve 26 also having a gear 28. The gear 28 comprises a sun gear for a planetary gear set, the latter further comprising a ring gear 30 and spider shafts 32 having pinions 34 thereon engaged with and lying between the sun 28 and the ring 30. The ring 30 as shown is fixed against rotation. The sleeve 26 embraces and is rotatable with and with respect to a propeller shaft 36. Also embracing the propeller shaft and secured thereto is a sleeve 38 including a sun gear 40 and a drive gear 42. The sun gear 40 engages pinions 44 on the spider shafts 32, the pinions 44 in turn engaging a rotatable ring gear 46. The gearing just described comprises a transfer gear set whereby, by rotation or fixation of the ring gear 46, the propeller blades may be caused to change pitch in either direction or to remain in a fixed pitch position.

The gearing elements now to be described comprise means by which the ring gear 46 may be rotated in either direction or locked stationarily. The elements as indicated in Fig. 5 are contained and mounted within a non-rotating housing 48. Driving connections between some of these gears are shown in Figs. 1 and 6 as dotted lines, the gear system in Figs. 1 and 6 being laid out or developed for better comprehension of the functioning of the system. In Fig. 5, the same elements are shown in substantially the configuration they would occupy in an operative propeller assembly, the various elements being arranged around the propeller shaft 36 for compactness and to minimize weight and space requirements.

The gear 42, rotating with the propeller shaft 36, drives a gear 50 secured to a gear 52. The latter gear engages a gear 54 forming part of a clutch unit 56 which has an output pinion 58 drivably engaged with the control ring gear 46. Another gear 60 is meshed with and driven by the gear 54 to drive a clutch unit 62 which has an output pinion 64 drivably engaged with the control ring gear 46. The clutch units 56 and 62 comprise hydraulically actuated multi-disk driving connections which may selectively be engaged by the application of hydraulic pressure to conduits 66 and 68 respectively during normal propeller operation. When hydraulic pressure is admitted to the unit 56, the gears 54 and 58 will be locked together for unitary rotation, the arrangement being such that engagement of the clutch 56 will move the control ring gear 46 to produce pitch increasing movement of the propeller blades. Since the gear 60 rotates oppositely from the gear 54, engagement of the clutch 62 will produce opposite rotation of the control gear 46 and will produce pitch decreasing motion of the propeller blades 14. When neither clutch 56 or 62 is engaged, the pinions 58 or 64 are free, although the gears 54 and 60 will be driven continuously due to rotation of the gear 42.

A brake unit 70 is provided in the housing 48 having a pinion 72 engaged with the control drive gear 46. When the brake is engaged, the gear 72 and consequently the control gear 46 are locked against rotation, thereby preventing propeller blade pitch change. The brake 70 is of the same type as is shown in Fig. 13 of the aforesaid Chillson application Serial No. 675,383, the brake including a centrifugally responsive mechanism whereby failure of oil pressure in the system will cause locking of the brake and prevention of further pitch change even though the control system may call for pitch change. In this connection, the brake assembly 70 carries a gear 74 driven from the drive gear 42 which operates the centrifugal device. The brake 70 is provided with a hydraulic conduit 76 connected to the source of hydraulic pressure providing pressure fluid to operate in conjunction with the centrifugal device. Another conduit 78 is connected to the selective valve mechanism to be described which controls normal engagement or disengagement of the brake mechanism.

The propeller system further includes an independent motor 80 selectively operable at times to actuate the propeller pitch changing mechanism when hydraulic power is not available. This motor is connected through gears 81, 82, 83 and 84 to a driving pin 85 engageable at times with a connection 86 drivably connected to the gear 72. Upon operation of the motor 80, the driving connection is established between 85 and 86 whereby the pitch control gear 46 may be rotated in either direction to accomplish pitch change without recourse to the hydraulically operated clutches and brakes 56, 62 and 70. These mechanisms just described are disclosed in detail in the aforesaid Chillson patent application and it is deemed unnecessary to describe their detailed operation in the present application.

Although the transfer gearing is disclosed in the aforesaid Chillson application, a brief review of its mode of operation is here presented. The ratios of the two planetaries 46, 44, 40, and 30, 34, 28, are identical. Under fixed pitch conditions, the blade control gear 46 is stationary and the sun gear 40 rotates with the propeller. Thus, the spider shafts 32 will rotate at an intermediate propeller speed. Since the ring gear 30 in the front planetary is stationary, the sun gear 28 on the sleeve 26 will be caused to rotate at propeller speed. Thereupon, the gear 24 will rotate with but not relative to the propeller and no pitch change will occur. If, however, the control gear 46 is rotated either in the direction of or opposite to the direction of propeller rotation, the sleeve gear 28 will be caused to rotate in the appropriate direction relative to the propeller shaft, while also rotating therewith. Thus, rotation will be imparted to the gears 24 and 22 to attain pitch changing movement of the blades 14.

The mechanism described above, under the influence of suitable control devices, allows of locking of propeller blades against pitch change by engagement of the brake 70 and allows of increasing or decreasing pitch change at a constant rate by solid engagement of either of the clutches 56 or 62. The system also provides for emergency propeller pitch change by the use of the feathering motor 80.

The control mechanism now to be described includes a cycling valve along with hydraulic supply and control arrangements by which the clutches 56 and 62 and the brake 70 may be actuated on a pulsating basis, the pulsations being applied at substantially constant frequency but at varying dwell to give the effect of a variable rate of pitch change. Under conditions of normal governing operation of a propeller, a low rate of pitch change is desirable. When a demand is made for pitch reversal or for feathering, a high rate of pitch change is desirable. If propeller pitch change of considerable magnitude is desired during normal operation it is beneficial to provide an initial high rate of pitch change, which gradually diminishes to a low rate as the desired pitch angle is approached. The ability to secure a variable rate of pitch change is particularly desirable in connection with the application of controllable pitch propellers to internal combustion turbines where the propeller control coordinates with the controls for the turbine to produce speed and power control for the turbine.

In the system of Fig. 1, the propeller is adapted for rate of pitch change control while in Fig. 6 the system is adapted for blade angle control. The differences will be described later but the essential parts of the control system are similar for both arrangements.

Referring now to Figs. 1 through 4, a hydraulic system for actuating the clutches 56 and 62 and the brake 70 includes a reservoir 100 feeding a pump 102 whose output line is indicated at 104. Hydraulic lines are indicated in dot-dash lines to distinguish them from dotted line mechanical driving connections. The pump is driven from the drive gear 42 on the propeller, the driving connection being indicated by dotted line 106. The output line 104 constitutes a fluid pressure manifold which delivers pressure fluid to several auxiliaries and particularly to a cycling valve assembly 108 through a passage 110. The cycling valve comprises two bores 112 and 114, communicating with one another at their upper ends as at 116, both bores being fitted with piston-equipped valve stems 118 and 120 respectively. The valve stems 118 and 120 are pressed downwardly by springs 122 and 124, the valve stems extending downwardly through the valve housing 108 to engage an axially movable cycling cam 126 carried on a shaft 128. The cycling cam shaft is driven, as noted by the dotted line 106, from the propeller gear 42 whereby the cam rotates at a speed corresponding to propeller speed. The cam 126, when disposed as shown, provides for the dropping and lifting of the valve stems 118 and 120, the dropping of the stems occurring at points 130 on the cam, the stems being raised as the cam rotates by the cam riser 132. The ends of the cam 126 are relieved in helical form. If the cam shaft 128 is moved axially to the left the cam riser 132 will lift the stem 120 and the stem will drop off the cam late or early in accordance with the axial position of the cam, at points such as 130' or 130'' shown in Figs. 3 and 4. Correspondingly, if the cam be moved bodily to the right, the valve stem 118 will rise at the same instant during each turn of the cam but will descend in accordance with the extent of movement of the cam toward the right. During such movements, the dwell of the valve stem in the raised position will vary in accordance with the axial position of the cam 126 but the frequency of reciprocation of the valve stem remains the same.

The cam shaft 128 is connected to a rate of pitch change control lever or member 134 through a suitable linkage such as the arm 136 and the yoke connection 138—140, the element 138 comprising a yoke and the elements 140 comprising lands on the shaft 128 between which the yoke 138 is engaged. Operation of the lever 134 in a clockwise direction is arranged to yield as shown increasing propeller blade pitch while counterclockwise operation of the lever 134 is arranged to yield decreasing propeller pitch.

When the cam 126 is centered as shown, both valve stems 118 and 120 are held in a raised position by means to be described. Leftward cam movement releases stem 120 for reciprocation and rightward cam movement releases stem 118 for reciprocation. Pressure fluid from the header 104 enters the valve bore 114 through the line 110. With leftward cam movement the valve stem 120 descends upon rotation of the cam 126, a valve piston 141 descends and the line 110 communicates with a line 142, transmitting pressure fluid to the conduit 66 of the increased pitch clutch 56 thereby engaging said clutch and effecting a drive from the propeller gear 42 to the pitch control gear 46. Concurrently, a valve head 144 on the stem 120 lowers and connects a passage 146 within the valve 108 to the cross-connection 116 between the valve bores which is vented to the sump 100 through passages 148 and 148'. Since the energizing conduit 78 for the brake 70 is connected as at 150 to the valve housing 108, and since the valve stem 118 is held in a raised position, the brake 70 is now vented to the sump, disengaging the brake and permitting the indicated increased pitch operation of the propeller to take place. As the cam 126 continues to rotate, the valve stem 120 is raised, establishing engagement of the brake 70 through the conduits 110, 146 and 150, and the clutch 56 is de-energized through drainage thereof through the conduits 66, 142 and 148'.

If the cam 126 is moved rightwardly by the control 134 for pitch decrease the valve 118 reciprocates as the cam rotates. With the stem 118 raised, the decrease pitch clutch 62 is disengaged, the clutch cell being drained through the conduit 68, a conduit 152 entering the valve housing 108 below the lower piston 153 on the valve stem 118 and thence to the sump through the passages 148 and 148'. Concurrently, the brake is energized by pressure fluid passing thereto through the passages 110, 146, 150 and 78. When the stem 118 and its piston 153 are in the lower position due to rotation of the cam 126, pressure fluid will flow to the decreased pitch clutch 68 through the passages 110, 146 and 152. At the same time the upper piston 155 on stem 118 descends, and the brake 70 will be disengaged by the relief of fluid therein through the passages 78, 150, 116, 148 and 148'.

In the above description it was assumed that when the cam 126 is centered, both valve stems 118 and 120 will be held in the uppermost position. This is accomplished by brake shoes 156 and 158 embracing the respective valve stems, said brake shoes being held in engagement with their stems by small brake cylinders 160 and 162 connected hydraulically to a valve unit 164 operated through a link 166 by the rate of pitch change control lever 134. The valve unit 164 is connected at 168 to the pressure feed line 104 and is connected at 170 and 172 to the drain line 148. When no pitch change is called for, pressure fluid passes to both brake cylinders 160 and 162 through the valve 164, locking both valve stems 118 and 120 in the raised position so that, as the cam 126 rotates, the valve stems do not drop into the recesses on the cam 126, thus avoiding undue wear on the valve mechanism during propeller operation and prevening pitch changing cycles when there is no call therefor. When increased pitch change is called for, the valve stem 166 is moved to the right thereby connecting the brake cylinder 162 to the drain 148 through the valve 164, and leaving pressure on the brake cylinder 160. This permits the valve stem 120 to reciprocate as the cam 126 rotates. If a call for pitch decrease is made by the lever 134, the brake cylinder 160 is connected to the drain 148, leaving pressure on the brake cylinder 162. This holds the valve stem 120 in the raised position but allows the valve stem 118 to reciprocate as the cam 126 rotates.

When either a call for increased pitch or decreased pitch is made by movement of the lever 134 and by axial movement of the cam 126, the appropriate valve stem 118 or 120 will reciprocate and the active valve will alternately cause engagement and disengagement of the clutch 56 or 62 with concurrent respective disengagement and engagement of the brake 70. If the control lever 134 calls for a high rate of pitch change, the cam 126 is shifted a considerable distance axially; for instance, the cam section at the section line 4 may lie beneath the valve stem 120 and as the cam rotates there will be a comparatively brief period during one turn of the cam when the clutch 56 is disengaged and a comparatively long period during the rotation of the cam when the clutch 56 is engaged. Thereby, nearly full rate of pitch change is attained. For any intermediate axial position of the cam 126 a lesser period of clutch engagement is afforded and a longer period of clutch disengagement, giving a lesser rate of pitch change. When the cam is centered as shown, the valve stems 118 and 120 are held in the raised position so that no pitch change may occur since neither of the clutches 56 or 62 are given an opportunity to engage.

To review briefly the operation of the valve unit 108, either but not both of the valve stems 118 and 120 may reciprocate at one time. When the valve stem 118 reciprocates, its upper piston 155 alternately lies above and below the brake conduit 150. Likewise the lower piston 153 alternately vents the decreased pitch clutch 62 or permits pressure fluid to be imposed thereon from the conduit 146 and the supply line 119. When the valve 120 is active, the upper piston 144 alternately opens the line 146 to the pressure source or opens it to the drain cavity 116, said passage 146 being connected to the brake. Concurrently, the lower piston 141 alternately connects the increased pitch clutch 56 to the drain or connects the clutch to the pressure source through the conduit 110.

Provision is made in the valve assembly 108 to hold both of the valve stems 118 and 120 in an upward position in case of failure of the hydraulic fluid pressure supply. For this purpose, a cavity 182 is provided in the valve bore 112 and a cavity 184 is provided in the valve bore 114, both of these cavities being isolated from the previously described active portions of the valve bores by a partition 186. Both of these cavities are connected through conduits 188 and 190 respectively to a valve unit 192 supplied with pressure fluid from the fluid pressure supply line 104 through a conduit 194. Within the cavities 182 and 184 are pistons 196 and 198 respectively spring pressed upwardly by springs 200 and 202. When oil pressure supply is normal, the pistons 196 and 198 are pressed downwardly, compressing the springs 200 and 202. Should oil pressure relax in either cavity, the pistons 196 and 198 rise within the cavities and engage stops 204 and 206 respectively secured to the valve stems 118 and 120. The springs 200 and 202 are stronger than the springs 122 and 124 at the top portions of the valve bores and thus, may overcome the upper springs and force the valve stems 118 and 120 upwardly, thereby holding the increase and decrease pitch clutches 56 and 62 disengaged and leaving the brake 70 engaged if there is any residual pressure in the hydraulic pressure system. Whether or not pressure exists at this time in the brake 70 is immaterial for the centrifugal device in the brake 70, referred to in the aforesaid application, will lock the propeller in a fixed pitch position if the propeller be rotating. If the propeller is not rotating, selective control of pitch will be afforded by the feathering motor 80.

Operation of the feathering motor 80 is responsive both to operation of the control lever 134 and to lack of adequate oil pressure from the pump 102 to operate the propeller hydraulically. To this end, the lever 134 operates a pair of switches 210 and 212 for the selection of either increase or decrease pitch change. Both of these switches are serially connected with the switch 214 which is normally open when oil pressure exists, through a hydraulic cell 216 connected to the pressure conduit 104. The switch 214 is connected to a power source such as a battery 218 and thence to ground. Should oil pressure fail, switch 214 closes under the influence of a spring 220 and increase or decrease pitch is attained through closure of the switches 210 or 212 by the lever 134. Closure of these switches respectively energizes conductors 222 or 224 leading through limit switches 226 and 228 to the increase and decrease field windings within the motor 80. Said motor, like that disclosed in the aforesaid co-pending application, comprises a brake which is released by the energization of the increase or decrease pitch field windings of the motor, thus permitting the motor pinion 81 to turn and to rotate the pitch control gear 46 of the propeller to cause pitch change in a manner previously described.

Provision is made for establishing pitch limits beyond which the blades of the propeller may not be rotated. A screw shaft 230 carries a pinion 232 driven from the pitch control gear 46 as shown. Upon the screw shaft 230 is a sleeve 234 having end flanges 236 and 238. The position of the sleeve 234 on the screw 230 is established by the instant pitch position of the propeller blades since, for any pitch position of the propeller blades there will be a definite position of the pitch control gear 46 which drives the screw shaft 230. When the propeller blade pitch becomes high, the sleeve 234 will move to the left as shown and when the limit is reached, the flange 238 on the sleeve will open switch 226 and also will move the core 240 of the valve 192 to the left. By opening the switch 226, pitch increasing operation of the electric motor will be stopped if the latter is operating. By moving the valve core of the valve 240 to the left, if the hydraulic system is operating, pressure fluid will be cut off from the passage 190 leading to the cavity 184 cooperating with the increase pitch valve stem 120. With this action, the spring 202 in the valve bore 114 will hold the valve stem 120 in the raised position stopping such pitch increasing movement as may be afforded by the hydraulic system.

If the propeller blades move to the low limiting pitch, the sleeve 234 on the screw shaft 230 will move toward the right whereupon the sleeve flange 236 will open the limit switch 228, cutting off power to the electric motor 80 and stopping decreasing pitch change of the blades if the electric motor 80 is active. If the hydraulic system is active, movement of the valve core 240 to the right, by the sleeve flange 236, will cut off the flow of pressure fluid to the conduit 188 and the cavity 182 associated with the decreasing pitch valve stem 118. Thereupon, the decreasing pitch valve stem 118 will rise under the influence of the spring 200, stopping operation of the decreasing pitch clutch 62 if the latter had been operating under the influence of hydraulic pressure.

In the above description reference has been made to Fig. 1 wherein the lever 134 is a control for the rate of pitch change. In this embodiment, the screw shaft 230 and its associated translatable sleeve 234 provides a takeoff for a pitch indicator which may, if desired, be utilized in conjunction with a coordinated propeller and gas turbine control system.

Now referring to Fig. 6, substantially the same mechanism is shown as above described with the exception that a control lever 250 is provided which is selectively movable to any one of a number of positions to establish a certain blade angle setting. This lever 250 is equipped with a sector gear 252 engaged with a translatable rack 254 having a lever 256 pivoted thereto. Said lever is provided with two additional spaced apart pivots 258 and 260. The pivot 258 connects by a link 262 to the pitch indicating sleeve 234 whereby the position of the pivot 258 is fixed by the instant pitch setting of the propeller blades. The pivot 260 connects through a link 264, another link 266 centrally pivoted at 268 to a fixed member, and thence to a yoke 270 engaging the lands 140 on the cam shaft 128. When a call for an increased blade pitch setting is made, as by rotating the sector 252 in a counterclockwise direction, the link 256 swings clockwise about the instantaneously fixed pivot 258, activating the valve assembly 108 to call for increased pitch under the influence of the hydraulic system or alternatively calling for increased pitch through the switch 210 if the electrical system is active. As pitch increase occurs, the sleeve 234 will move leftwardly along the screw shaft 230, pulling the pivot 258 and swinging the link 256 counterclockwise about the rack pivot until the call for increased pitch has been cancelled by attainment of the increased pitch called for by the lever 250. Upon a call for decreased pitch, an opposite sequence of events takes place. If a pitch call beyond the established pitch limits of the system is made, the pitch limiting system previously described will come into action. Likewise, the changing of propeller pitch by the hydraulic system or by the electrical system will occur depending upon the presence or absence respectively of fluid pressure from the pump 102. Also, the safety features previously described in connection with the hydraulic system remain intact so that fixed pitch of the propeller blades will be established should the hydraulic system fail when the propeller is rotating.

The control system of this invention, as inferred in the introduction to the specification, enables varying rates of pitch change to be attained in a hydro-mechanical system and further provides for emergency pitch change in a mechanical type propeller in case of failure or inoperativeness of an associated hydraulic system.

The showings of Figs. 1 and 6 are primarily schematic in character and while they include all of the essential electrical and mechanical components are not presented as a final mechanical design. The several hydraulic, mechanical and electrical elements involved in themselves are familiar to those skilled in the art and these units may be coordinated in the aggregate propeller design to attain desired characteristics of compactness, simplicity and light weight. Referring briefly to Fig. 5, the entire cycling valve mechanism may be contained within a comparatively small housing 108' driven from the power gear 42. Other hydraulic and electrical elements of the system may be combined in additional housings secured within the fixed propeller structure 48, such elements including the pressure switch 214 and other semi-independent assemblies.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. In a propeller comprising a hub and blade adjustably mounted therein for pitch change, mechanism including a gear train and a clutch therein drivably connected to the blade for changing blade pitch, said clutch being engageable to cause pitch change and disengageable to stop pitch change, cycling means connected to control clutch operation, and connected to and driven by said propeller to cause repeated clutch engagements and disengagements at predetermined frequency means included in said cycling means to vary dwell of clutch engagement and disengagement in each cycle accordingly as the blades are close to or far from the desired blade pitch, and a brake secured to the propeller engageable to lock said blade against pitch change and to unlock said blade for pitch change, said brake being operated by and connected to said cycling means to engage as said clutch is disengaged, and vice versa.

2. In a propeller comprising a hub and blade adjustably mounted therein for pitch change, mechanism including a gear train and a clutch therein for changing blade pitch, said clutch being engageable to cause pitch change and disengageable to stop pitch change, cycling means controlling clutch operation, driven by said propeller to cause repeated clutch engagements and disengagements at predetermined frequency means included in said cycling means to vary dwell of clutch engagement and disengagement in each cycle accordingly as the blades are close to or far from the desired blade pitch, said clutch being hydraulically operated, said cycling means comprising a hydraulic valve connected to said clutch and a rotatable and slidable cam operable to open and close said valve, and means to slide said cam to control operation of said cycling means.

3. In a propeller comprising a hub and blade adjustably mounted therein for pitch change, mechanism including a gear train and a clutch therein for changing blade pitch, said clutch being engageable to cause pitch change and disengageable to stop pitch change, cycling means controlling clutch operation, driven by said propeller, to cause repeated clutch engagements and disengagements at substantially constant frequency and at varying time periods for each cycle, means to initiate and stop operation of said cycling means in relation to said clutch, said clutch being hydraulically operated, said cycling means comprising a hydraulic valve connected to said clutch, and said cycling means including also a slidable rotatable cam having a lobe of varying width along its length operable to open and close said valve, the axial position of said cam establishing the open and close dwell of said valve and consequently, the driving and non-driving dwell of said clutch.

4. In a propeller comprising a hub and blade adjustably mounted therein for pitch change, mechanism including a gear train and a clutch therein for changing blade pitch, said clutch being engageable to cause pitch change and disengageable to stop pitch change, cycling means controlling clutch operation, driven by said propeller to cause repeated clutch engagements and disengagements at predetermined frequency means included in said cycling means to vary dwell of clutch engagement and disengagement in each cycle accordingly as the blades are close to or far from the desired blade pitch, said clutch being hydraulically operated, and said cycling means comprising a hydraulic valve connected to said clutch and a rotatable cam operable to open and close said valve, said cam being axially movable relative to the valve and having a valve opening lobe varying in circumferential length along the cam, whereby dwell of valve opening is determined by the axial position of said cam lobe relative to said valve, and means to move said cam axially to control operation of said cycling means.

5. In a propeller comprising a hub and blade adjustably mounted therein for pitch change, mechanism including a gear train and a clutch therein drivably connected to the blade for changing blade pitch, said clutch being engageable to cause pitch change and disengageable to stop pitch change, cycling means connected to control clutch operation, connected to and driven by said propeller to cause repeated clutch engagements and disengagements at predetermined frequency means included in said cycling means to vary dwell of clutch engagement and disengagement in each cycle accordingly as the blades are close to or far from the desired blade pitch, means connected to said cycling means to control operation thereof a brake secured to the propeller engageable to lock said blade against pitch change and to unlock said blade for pitch change, said brake being operated by and connected to said cycling means to engage as said clutch is disengaged, and vice versa, said brake and clutch being hydraulically operated; said cycling means comprising a valve connected to operate said brake and clutch coincidentally and in opposition, and a rotatable cam engageable with said valve for actuating same.

6. In a propeller comprising a hub and blade adjustably mounted therein for pitch change, mechanism including a gear train and a clutch therein drivably connected to the blade for changing blade pitch, said clutch being engageable to cause pitch change and disengageable to stop pitch change, cycling means connected to control clutch operation, connected to and driven by said propeller to cause repeated clutch engagements and disengagements at predetermined frequency means included in said cycling means to vary dwell of clutch engagement and disengagement in each cycle accordingly as the blades are close to or far from the desired blade pitch, a brake secured to the propeller engageable to lock said blade against pitch change and to unlock said blade for pitch change, said brake being operated by and connected to said cycling means to engage as said clutch is disengaged, and vice versa, said brake and clutch being hydraulically operated; said cycling means comprising a valve connected to operate said brake and clutch coincidentally and in opposition, and a rotatable cam drivably connected to the propeller and engageable with said valve for actuating same, said cam being axially movable and having a valve-lifting and engaging lobe of varying circumferential length axially therealong; and means connected to the cam to move said cam axially to vary the dwell of clutch and brake operation for each cycle of operation thereof.

7. In a propeller comprising a hub and blades adjustably mounted therein for pitch change, continuously rotating power means for changing blade pitch, mechanism connecting said means with said blade including a pitch increasing hydraulically operated clutch and a pitch decreasing hydraulically operated clutch, a valve connecting a hydraulic supply to each clutch, continuously rotating means comprising a cam for operating said clutch valves intermittently, and selectively operable means to operatively connect said cam and one said clutch valve to cause intermittent operation of the associated clutch.

8. In a propeller comprising a hub and blades adjustably mounted therein for pitch change, continuously rotating power means for changing blade pitch, mechanism connecting said means with said blade including a pitch increasing clutch and a pitch decreasing clutch, continuously rotating means comprising a cam for operating said clutches intermittently, selectively operable means to operatively connect said cam and one said clutch to cause intermittent operation thereof, a brake to anchor said blades against pitch change, and means to release said brake, operated by said cam, simultaneously with the engagement of either clutch.

9. In a propeller comprising a hub and blades adjustably mounted therein for pitch change, a power takeoff on the shaft of the propeller, gearing connecting said takeoff with the propeller blades for pitch change thereof, hydraulically operated clutches in said gear train connected to transmit pitch increasing and pitch decreasing motion from said takeoff to said blades, either clutch when solidly engaged affording a high rate of blade pitch change; and means to reduce and vary the rate of pitch change comprising hydraulic valves, one connected to control operation of each said clutch, and means driven by the propeller and selectively operable, connectable to engage and open and close either of said valves intermittently at predetermined frequency substantially proportional to propeller speed and for varying periods of open dwell according to the selected operation.

10. In a propeller comprising a hub and blades adjustably mounted therein for pitch change, a power takeoff on the shaft of the propeller, gearing connecting said takeoff with the propeller blades for pitch change thereof, hydraulically operated clutches in said gear train connected to transmit pitch increasing and pitch decreasing motion from said takeoff to said blades, either clutch when solidly engaged affording a high rate of blade pitch change; and means to reduce and vary the rate of pitch change comprising hydraulic valves, one connected to control operation of each said clutch, and means driven by the propeller and selectively operable, connectable to engage and open and close either of said valves intermittently at predetermined frequency substantially proportional to propeller speed and for varying periods of open dwell according to the selected operation, said propeller including a hydraulically operated brake connected within said gear train to prevent pitch change of said blades, and said hydraulic valves having means therein respectively to control fluid feed to engage and disengage said brake coincidentally with disengagement and engagement of said clutches.

11. In a propeller pitch changing mechanism, gearing to rotate the propeller blades in their sockets including a drive gear, a power gear means to drive said power gear, a clutch engageable to interconnect said drive and power gears, a device movable to engage and disengage said clutch, a rotating cam engageable intermittently with said device for alternately engaging and disengaging said clutch in successive cycles of predetermined frequency, and a member connected to said cam and moving it relative to said device for varying the time interval of clutch engagement during each said cycle.

12. In a propeller pitch changing mechanism, gearing for rotating the propeller blades in their sockets including a drive gear, a power gear, means connected to drive said power gear, a clutch engageable to interconnect said drive and power gears, a device connected and movable to engage and disengage said clutch, a movable and rotating cam engageable intermittently with said device for alternately engaging and disengaging said clutch in successive cycles of varying dwell and predetermined frequency means connected to drive said cam at substantially constant speed, and means connected to said cam for moving said cam relatively to said device independently of rotary movement of the cam to vary the time interval of clutch engagement during each said cycle.

JOSEPH M. MERGEN.
HOWARD MURPHY.

References Cited in the file of this patent

UNITED STATES PATENTS

| Number | Name | Date |
|---|---|---|
| 2,026,814 | Caldwell et al. | Jan. 7, 1936 |
| 2,248,789 | Setterblade | July 8, 1941 |
| 2,334,967 | Thomas et al. | Nov. 23, 1943 |
| 2,437,189 | Forsyth | Mar. 2, 1948 |
| 2,455,239 | Doussain | Nov. 30, 1948 |

FOREIGN PATENTS

| Number | Country | Date |
|---|---|---|
| 538,386 | Great Britain | July 31, 1941 |
| 581,327 | Great Britain | Oct. 9, 1946 |
| 581,342 | Great Britain | Oct. 9, 1946 |